United States Patent
Krishnaiyer et al.

(10) Patent No.: US 7,702,856 B2
(45) Date of Patent: Apr. 20, 2010

(54) DYNAMIC PREFETCH DISTANCE CALCULATION

(75) Inventors: Rakesh Krishnaiyer, Milpitas, CA (US); Somnath Ghosh, Sunnyvale, CA (US); Abhay Kanhere, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 11/271,415

(22) Filed: Nov. 9, 2005

(65) Prior Publication Data

US 2007/0106848 A1 May 10, 2007

(51) Int. Cl.
  *G06F 13/00* (2006.01)
  *G06F 13/28* (2006.01)
(52) U.S. Cl. .................. 711/137; 712/207; 717/151; 717/158; 717/160; 717/161
(58) Field of Classification Search .............. 717/158, 717/160
See application file for complete search history.

(56) References Cited

U.S. PATENT DOCUMENTS

2004/0123041 A1* 6/2004 Krishnaiyer et al. ........ 711/137
2005/0240896 A1* 10/2005 Wu et al. .................... 717/100

OTHER PUBLICATIONS

Gautam Doshi, Rakesh Krishnaiyer, Kalyan Muthukumar, Optimizing Software Data Prefetches with Rotating Registers, Proceedings of the International Conference on Parallel Architectures and Compilation Techniques, Sep. 2001, pp. 257-267.*
Kalogeropulos, S. Rajagopalan, M. Vikram Rao Yonghong Song Tirumalai, P., Processor Aware Anticipatory Prefetching in Loops, High Performance Computer Architecture, 2004. HPCA-10. Proceedings. 10th International Symposium on, Feb. 14-18, 2004, On pp. 106-106.*

* cited by examiner

*Primary Examiner*—Hyung S Sough
*Assistant Examiner*—Kimberly Jordan
(74) *Attorney, Agent, or Firm*—Blakely, Sokoloff, Taylor & Zafman LLP

(57) ABSTRACT

The prefetch distance to be used by a prefetch instruction may not always be correctly calculated using compile-time information. In one embodiment, the present invention generates prefetch distance calculation code to dynamically calculate a prefetch distance used by a prefetch instruction at run-time.

12 Claims, 8 Drawing Sheets

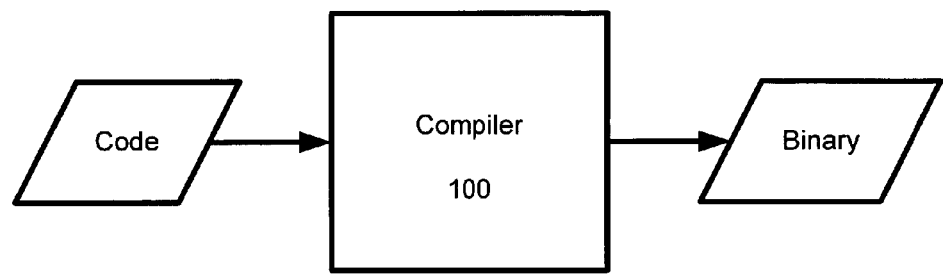
Figure 1 [Prior Art]
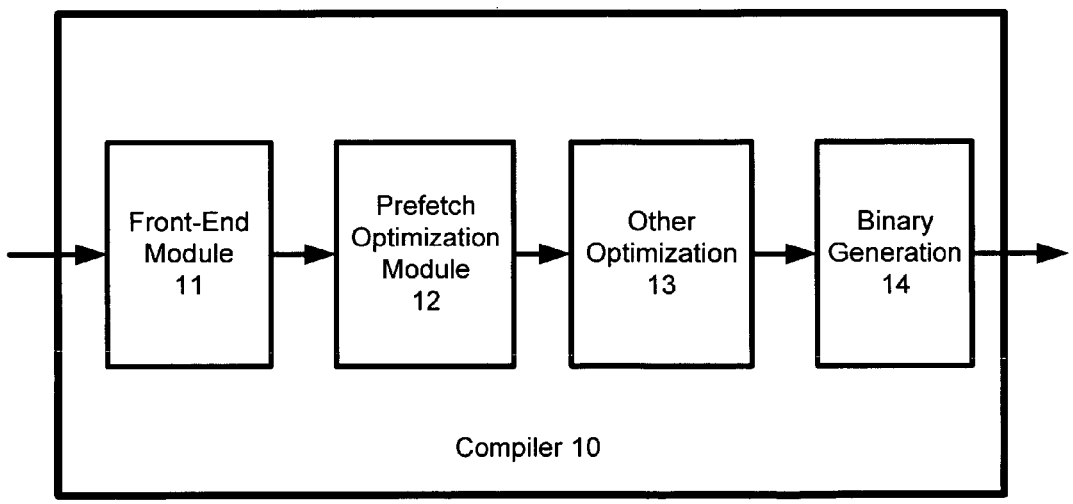
Figure 2 [Prior Art]

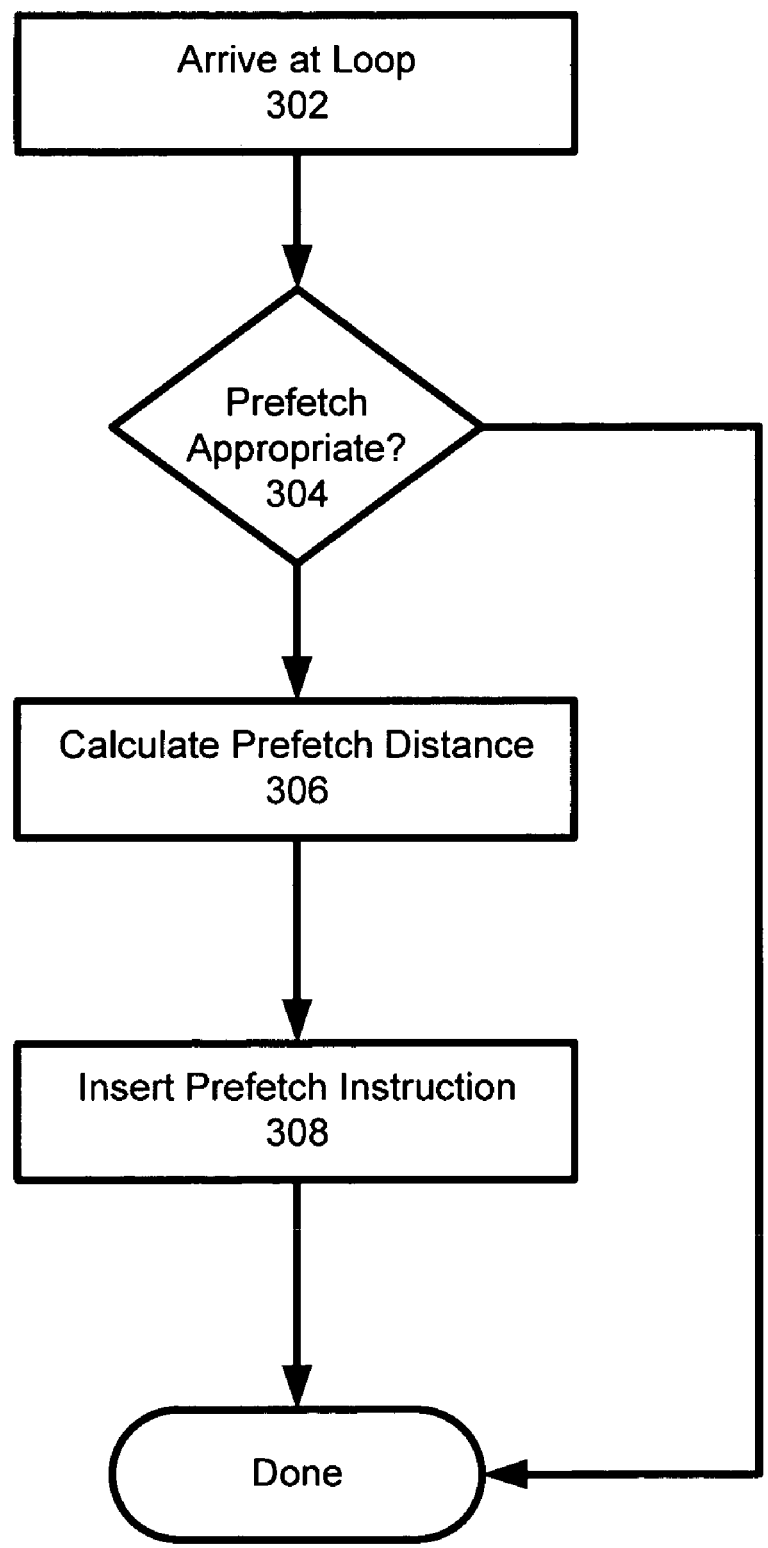
Figure 3 [Prior Art]

DYNAMIC PREFETCH DISTANCE CALCULATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to the field of compiler. More particularly, embodiments of the present invention relate to compiler-implemented prefetching.

2. Description of the Related Art

A compiler is software that translates a computer program written in a high-level language, such as C++ or FORTRAN, into machine language. As shown in FIG. 1, the compiler 100 takes code as input and generates a machine executable binary file. FIG. 2 shown some of the modules that can be implemented by compiler 100.

Compiler 100 can include a front-end module 11. The front-end module 11 can perform the various front-end processing of the programming language—e.g. like a C/C++ Front-End or a Fortran Front-Ent—such as The translating the high-level code written by a programmer into an IR used inside the compiler 100 and other such processing. The IR is compiler-specific and they are well-known in the art. Some examples are the RTL representation and tree SSA representations used by GCC[brm1], the Stanford University Intermediate Format (SUIF) representation[brm2], the Pegasus intermediate representation[brm3], the WHIRL intermediate representation of the MIPSpro Compiler from Silicon Graphics Incorporated.

Compiler 100 can also include a prefetch optimization module 12. One optimization performed by some compilers is prefetch optimization. Prefetch optimization masks memory access latency by issuing a memory request before the requested value is used. While the value is retrieved from memory—which can take up to 300 or more cycles—the processor can execute other instructions, effectively hiding the memory access latency. Data prefetching, or simply "prefetching," is well-known in the art.

The compiler 100 can perform other optimizations represented by block 13 in FIG. 2. These include inter-procedural optimizations, redundancy elimination, dead code elimination, constant propagation, copy propagation, loop transformations, and other such optimizations. The compiler then generates the binary executable from the optimized IR using the binary generation module 14.

A prior art method of prefetching is now described with reference to FIG. 3. In block 302 the parser performing the prefetch optimization arrives at a loop. A loop is generally defined as a sequence of instructions that repeats either a specified number of times or until a particular condition is met. Some example loop instructions in C++ are "while" and "for" loops.

In block 304, a decision is made as to whether the identified loop is appropriate for prefetching. A loop may be too short, not include a load to prefetch, or have some other property that eliminates it from prefetch optimization. If the loop is not appropriate for prefetching, then the process terminates and the parser continues searching for the next loop. If, however, the loop is a good candidate for prefetching, then, in block 306, the prefetch distance to be used for the prefetch is calculated.

The prefetch distance can be generally defined as the number of iterations of the loop ahead that a prefetch is issued before the actual load. At compile time, in block 306, a prior art compiler determines the prefetch distance using various factors, such as the amount of memory latency the prefetch needs to cover, the amount of work done inside the loop, and the value of the trip count (how many times the loop is repeated). Once the compiler calculates the prefetch distance, a prefetch instruction is inserted into the loop in block 308, the prefetch instruction using the calculated prefetch distance by identifying a memory locating having the appropriate prefetch distance. At execution time, the processor will perform prefetching according to this distance.

There are situations, however, in which the compile-time static prefetch distance calculation described with reference to FIG. 3 is not optimal and may even deteriorate performance. This is caused in general when information needed by the compiler to calculate the appropriate prefetch distance is not available at compile time. For example, the trip count affects the prefetch distance, as described above. However, a loop may have an unknown trip count that is not known until run-time execution. The prior-art method is this situation would either use a guess or default trip-count (which may be wrong on many occasions) or forgo prefetching altogether.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 1 is a block diagram illustrating a prior art compiler;

FIG. 2 is a block diagram illustrating a more detailed prior art compiler;

FIG. 3 is a flow diagram illustrating prior art prefetch optimization including static prefetch distance calculation;

DETAILED DESCRIPTION

Dangerous Instructions and Safety Checks

Figure 4:
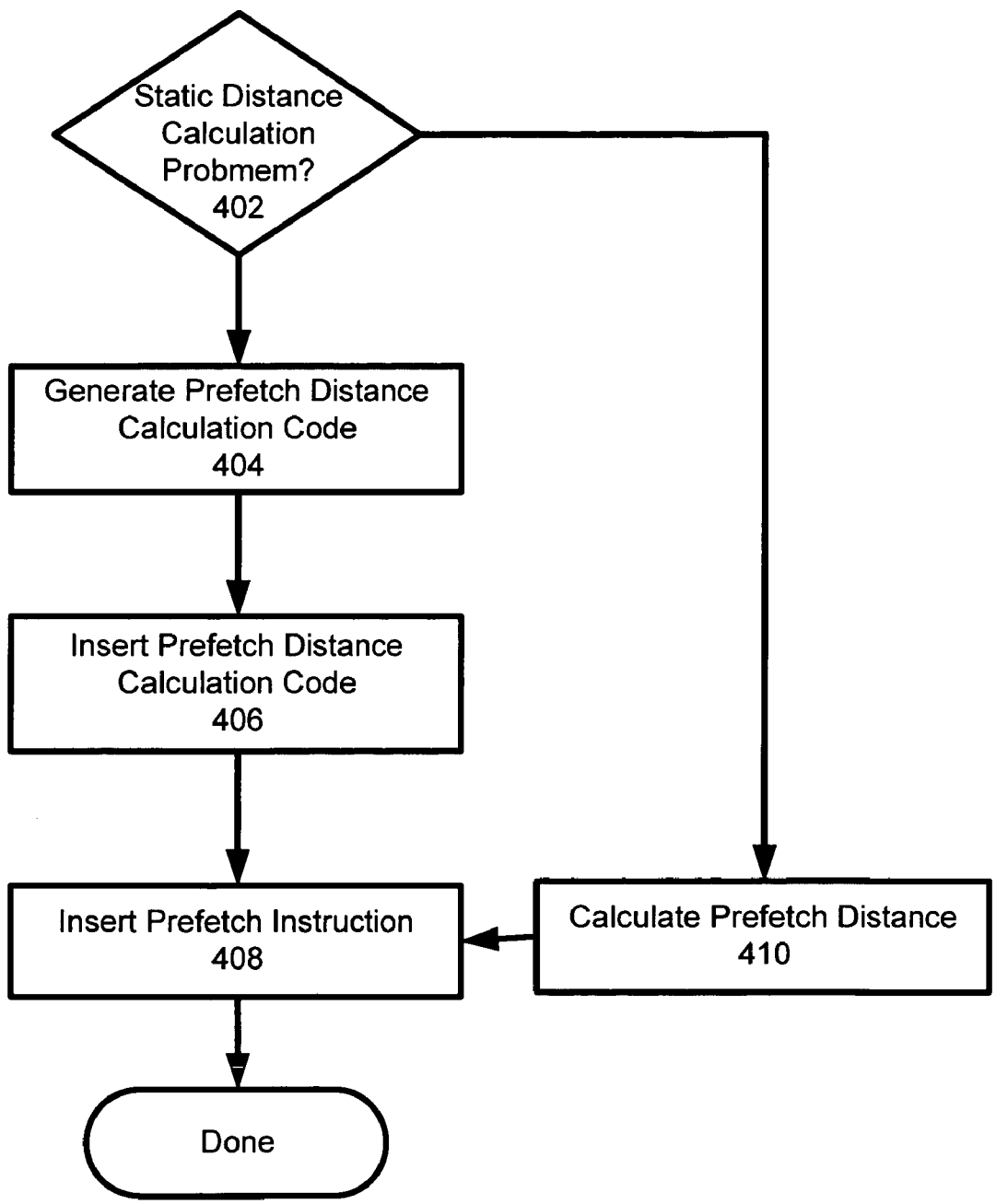
FIG. 4 is a block diagram illustrating prefetch optimization including dynamic prefetch distance calculation according to one embodiment of the present invention.

One embodiment of the invention, a method for dynamically calculating the prefetch distance of a prefetch instruction, is now described with reference to FIG. 4. When the compiler arrives at block 402, it has already performed blocks 302 and 304 of FIG. 3 and the determination has been made that prefetching for a load in the loop is appropriate. In block 402, a decision is made by the compiler as to whether there are potential difficulties or problems that make static distance calculation potentially undesirable. One such problem can be an unknown trip count, as discussed above. Other such problems will be discussed further below.

If, in block 402, it is determined that there are no problems associated with static prefetch distance calculation, then, in block 410 the prefetch distance is calculated by the compiler using traditional methods discussed above. However, if, in block 402, one or more of the problems associated with static prefetch distance calculation is observed, then, in block 404 the compiler generates dynamic prefetch distance calculation code designed to calculate the prefetch distance at run-time using presently unknown values that will be known at runtime. Specific examples will be provided below to illustrate what such code can look like.

In block 406, the prefetch distance calculation code is inserted into code being compiled by the compiler. The code may be still in high-level format or some IR format. In one embodiment, the prefetch distance calculation code is inserted somewhere before the beginning of the loop and after values used by the prefetch distance calculation code are defined and known. Since, in one embodiment, the prefetch distance calculation code is outside of the loop, it needs to be executed only once.

In block 408, the prefetch instruction is inserted into the code. In one embodiment, the prefetch instruction is inserted into the loop. If the prefetch distance was calculated statically in block 410, then the distance argument of the prefetch instruction will be the value thus calculated. If, however, prefetch distance code was inserted into the code to dynamically calculate the prefetch distance at run-time, then the memory location of the prefetch instruction will be determined as a variable based on the prefetch distance calculated dynamically by the prefetch distance code.

Example Embodiments

Various embodiments of the present invention are now described with reference to some specific examples. However, the scope of the invention is not limited to these specific embodiments. A first example is now described with reference to FIG. 5. In block 502, a loop is encountered by the compiler that has a statically unknown trip count. As explained above, this means that the number of times the loop will be iterated is not known at compile time. For example, the following loop written in C++ has a statically unknown trip count.

```
for (i = 0; i < veclen; i++) {
    diff1 = x[i] −5;
    dval1 −= diff1 * diff1 * y[i];
}
```

This loop is iterated until the value of i (which is being incremented by 1 each iteration) is no longer less than the value of veclen. However, the value of veclen may not be known at compile time, since it might vary based on execution. Thus, if prefetching is implemented to cover all of the latency associated with the memory access but the trip count turns out to be small at execution time, then the prefetching will not be useful.

In block 504, prefetch distance calculation code is generated by the compiler to dynamically calculate the prefetch distance at run time. In one embodiment, the prefetch distance calculation code specifically addresses the problem of the statically unknown trip count. One example of the prefetch distance calculation code that would dynamically calculate the prefetch distance for the loop above is:

```
trip_count = veclen;
if (trip_count > large_dist*3)
    distance = large_dist;
else
    distance = (trip_count/3 +1);
```

In the above code fragment, large_dist is the compiler-calculated distance needed to cover all of the latency of the data access assuming the data is to be loaded from memory (not cache). To explain the above code to those not skilled in the art, the variable trip_count is given the value of veclen. The variable veclen has the value that is the actual trip count of the loop. When this code is executed, the value of veclen will be known, as opposed to compile time, when it is not known.

If the now known trip count is larger than three times the distance needed to cover all latency, then this is the prefetch distance used. Otherwise, one plus a third of the actual trip count is used as the prefetch distance. These specific numbers are specific to this embodiment. Various other values may be used.

The formulas shown above have been experimentally shown to be effective. However, the multiplier for large_dist can be any number between 1 and 6. If fact, numbers larger than 6 could be used as well, but, based on the values used it the example above, the prefetch distance so calculated may not be optimal. Similarly, to calculate the smaller prefetch distance, the trip count can be divided by any number between 1 and 5, or any other number for other embodiments. The addition of 1 shown above is also not necessary and is specific to one embodiment. One skilled in the art will appreciate the relative simplicity of the prefetch distance calculation code generated. Thus, the overhead associated with the generation and execution of this code is low.

In block 506, the code generated by the compiler is inserted into the code being processed by the compiler. In one embodiment, the code is inserted before and outside of the loop. Then, in block 508, the prefetch instruction is inserted into the loop. The memory location of the prefetch distance depends on "distance," the dynamically calculated prefetch distance value defined in the prefetch distance calculation code generated in block 504. One skilled in the art will understand that even though the flow diagram of FIG. 5 suggests a certain sequence of execution, several blocks of FIG. 5 can be interchanged without affecting the final result.

The new resulting code fragment for this example would be as follows:

```
trip_count = veclen;
if (trip_count > large_dist*3)
    distance = large_dist;
else
    distance = (trip_count/3 +1);
for (i = 0; i < veclen; i++) {
    prefetch (&x[i+distance];
    prefetch (&y[i+distance];
    diff1 = x[i] −5;
    dval1 −= diff1 * diff1 * y[i];
}
```

One skilled in the art will understand that there are two prefetches inserted using the dynamically calculated "distance" variable, one for the x array and one for the y array. One skilled in the art will also understand how to generalize the above specific example to cover all cases where the trip count is not statically known at compile time.

A second example is now described with reference to FIG. 6. In block 602, a loop having a variable data stride is encountered by the compiler. Data stride can be defined as the value (in bytes) that represent the address difference between memory accessed in successive iterations of a loop. When non-contiguous elements of an array are being accessed, it is also referred to as array stride.

One problem caused by any such non-contiguous data access over successive iterations of a loop is that if the data stride is large enough, successive iterations of a loop may need to access different pages in memory. Pages are maintained using Translation Lookaside Buffers (TLBs) which may overflow or otherwise get stressed if prefetching were used in the presence of a large data stride. For example, the following loop written in C++ has a statically unknown data stride.

```
for (i = 0; i < veclen; i++) {
    sum += path[i*value1 + 5];
}
```

This loop is iterated until the value of i (which is being incremented by 1 each iteration) is no longer less than the value of veclen, which is assumed to be statically known for this second example. However, the value of value1 may not be known at compile time, since it might vary based on execution. Thus, if prefetching is implemented to cover all of the latency associated with the memory access, but the data stride turns out to be larger than assumed at execution time, then the prefetching will not be useful, and may even cause significant performance deterioration.

In block 604, prefetch distance calculation code is generated by the compiler to dynamically calculate the prefetch distance at run time. In one embodiment, the prefetch distance calculation code specifically addresses the problem of the statically unknown data stride. One example of the prefetch distance calculation code that would dynamically calculate the prefetch distance for the loop of the second example above is:

```
if (value1*data_size > PAGE_SIZE)
    distance = small_dist;
else
    distance = large_dist;
```

In the above code fragment—as in the first example—large_dist is the compiler-calculated distance needed to cover all of the latency of the data access assuming the data is to be loaded from memory. The value small—dist represents a compiler calculated distance that covers some latency but does not put undue pressure on the TLB. The value small—dist will be smaller than large_dist. When this code is executed, the value of value1 will be known, as opposed to compile time, when it is not known.

In laymen's terms, the above code fragment states that if the data stride (value1*data_size, data_size being the size of the type of data, e.g., integer, floating point, word) is greater than the page size used by the operating system, then the prefetch distance will be the larger distance that covers the entire latency, otherwise the prefetch distance will be the small distance that partially covers the latency. The formulas shown above have been experimentally shown to be effective. However, these specific formulas and code fragment are specific to this embodiment. Various other values and calculations may be used.

Blocks 606 and 608 can be performed in a manner similar to blocks 506 and 508 described with reference to FIG. 5. In one embodiment, the new resulting code fragment for this example would be as follows:

```
if (value1*data_size > PAGE_SIZE)
    distance = small_dist;
else
    distance = large_dist;
for (i = 0; i < veclen; i++) {
    prefetch(&path[i*value1 + 5 + value1 * distance];
    sum += path[i*value1 + 5];
}
```

Prefetching inside nested loops can also pose a non-contiguous data access problem. This situation is also related to the unknown trip count issue discussed in the first example. Nested loops describe one loop inside another loop. For simplicity, only two nested loops are described—referred to as the inside and the outside loop—but the situation can be applied to any number of nested loops. The issue summarized, is that a short run-time trip count for an inner loop may still work with a large prefetch distance is certain conditions regarding the data to be prefetched are satisfied. A third example directed to a nested loop situation is now described with reference to FIG. 7.

In block 702, two (or more) nested loops are encountered by the compiler. The inside loop has a statically unknown trip count. An example of such nested loops may be as follows:

```
int a[N, M], b[N,M]
do j = 2, ub1
    do i = 2, ub2
        a(i,j) = b(i-1,j) + b(i+1, j)
    enddo
enddo
```

To one skilled in the art, it will be apparent that the inner loop traverses the arrays a[ ] and b[ ] in the first dimension and the outer loop traverses the arrays in the second dimension. In one embodiment, if the trip-count of the inner loop is sufficiently close to the extent of the array in the dimension traversed by the loop—the first dimension in the example above—then a large prefetch distance covering the entire latency can be used. This is because, even though the trip-count of the inner loop may be small, the data prefetched will be useful in the successive iterations of the outer loop.

In the example above, the dimension of the arrays in the first dimension is N (some positive integer value). In block 704, prefetch distance calculation code is generated by the compiler to dynamically calculate the prefetch distance at run time. In one embodiment, the prefetch distance calculation code is generated to calculate the prefetch distance based on the observer data contiguity. In other words, in one embodiment, the prefetch distance calculation code sets the prefetch distance to cover all latency if data contiguity is present; otherwise the code calculates the prefetch distance based on the observed data contiguity.

In one embodiment, data contiguity is defined to be present if the inner loop traverses the array in the dimension of the loop by a sufficient amount. What a sufficient amount is may be defined in numerous ways according to various embodiments. The sufficient amount can be defined in terms of a percentage, such as between 95-100 percent data contiguity, no greater than some value, by observing whether the inner loop traverses the array in the dimension of the loop by covering most of the cache lines in that dimension, or in some other suitable manner. One example of the prefetch distance calculation code that would dynamically calculate the prefetch distance for the nested loops of the third example above is:

```
if (N – ub2 +1 <= SMALL_VALUE)
    distance = large_dist;
else
    distance = ((ub2 – 1)/3 + 1;
```

In the above code fragment—as in the first example—large_dist is the compiler-calculated distance needed to cover all of the latency of the data access assuming the data is to be loaded from memory. The value SMALL_VALUE is some small number that is allowed as a gap in data contiguity. The expression ((ub2−1)/3+1 represents the prefetch distance as calculated based on the actual trip-count of the inner loop when data contiguity is not present. When this code is executed, the value of ub2 will be known, as opposed to compile time, when it is not known.

In laymen's terms, the condition (N−ub2+1 <=SMALL_VALUE) is satisfied if trip-count of the inner loop (ub2) is within SMALL_VALUE of the extent of the array in the first dimension (N). The value of SMALL_VALUE can be a number of experimentally verified values. In one embodiment, SMALL_VALUE is 5. In another embodiment, it is between 3 and 12. In yet other embodiment its value depends on the data type and the cache line size.

If the condition is satisfied, then the prefetch distance is set to be the distance that covers all of the latency. Otherwise, the prefetch distance is calculated to be a third of the run-time trip-count plus one, just like in the first example. As in the previous two examples, the formulas shown above have been experimentally shown to be effective. However, these specific formulas and code fragment are specific to this embodiment. Various other values and calculations may be used.

Blocks 706 and 708 can be performed in a manner similar to blocks 506 and 508 described with reference to FIG. 5. In one embodiment, the new resulting code fragment for this example would be as follows:

```
if (N – ub2 +1 <= SMALL_VALUE)
    distance = large_dist;
else
    distance = ((ub2 – 1)/3 + 1;
int a[N, M], b[N,M]
do j = 2, ub1
    do i = 2, ub2
        prefetch(&a(i+distance,j);
        prefetch(&b(i+distance+1,j);
        a(i,j) = b(i−1,j) + b(i+1, j)
    enddo
enddo
```

Figure 5:
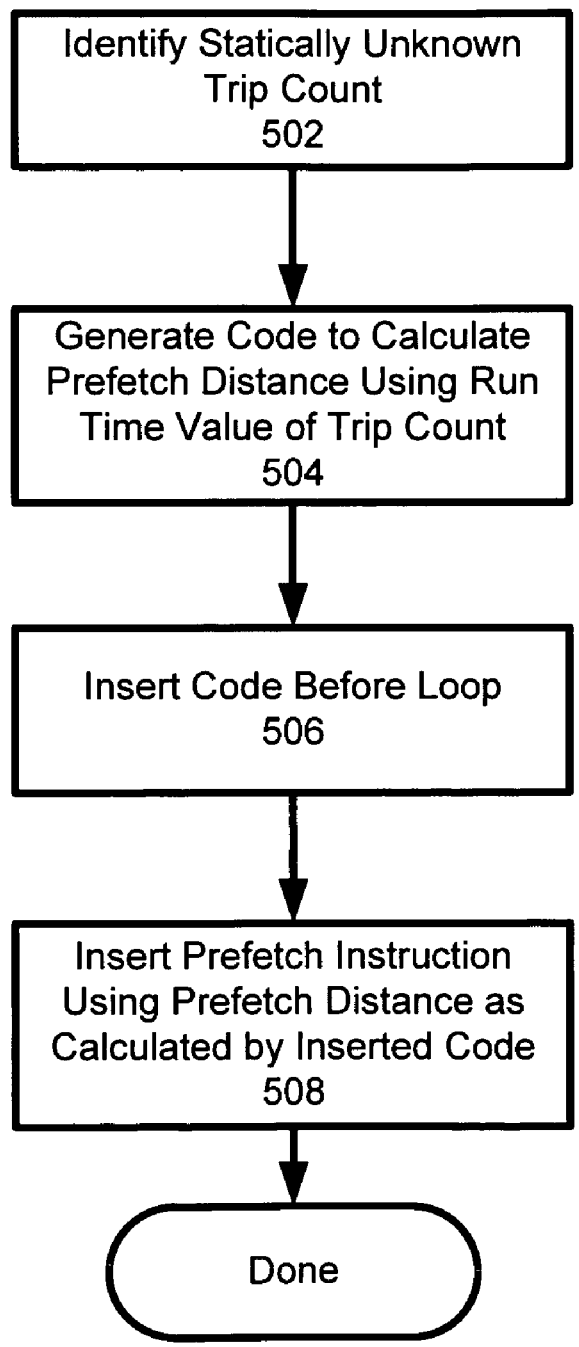
FIG. 5 is a block diagram illustrating dynamic prefetch distance optimization according to one embodiment of the present invention.
Figure 6:
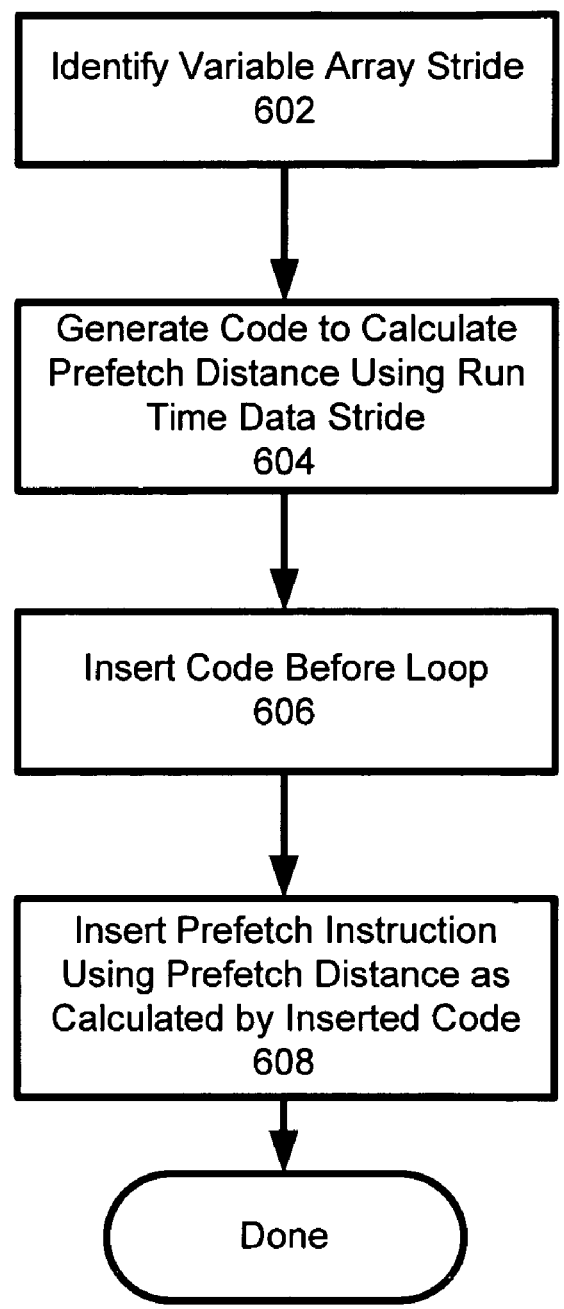
FIG. 6 is a flow diagram illustrating dynamic prefetch distance optimization according to another embodiment of the present invention.
Figure 7:
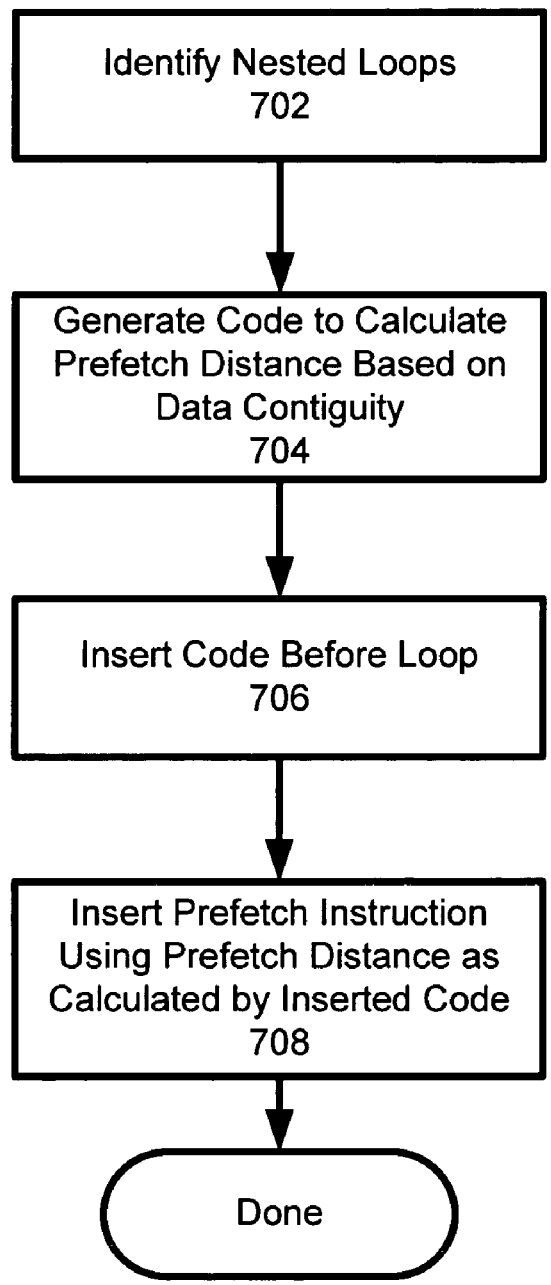
FIG. 7 is a flow diagram illustrating dynamic prefetch distance optimization according to yet another embodiment of the present invention.

The three examples described with reference to FIGS. 5-7 are set forth as example situations where dynamic prefetch distance calculation can be beneficial and how such situations can be addressed. However, the embodiments of the present invention are not limited to these specific situations or examples. For example, a single loop may present multiple unknowns, whereas, for simplicity of discussion, each example above included only one statically unknown piece of information. However, embodiments of the invention can be applied to, e.g., a loop having both a statically unknown trip-count and a statically unknown data stride. For example, the prefetch distance calculation code for such an example could be:

```
trip_count = veclen;
if (value1*data_size > PAGE_SIZE)
    distance = small_dist;
else if (trip_count > large_dist*3)
    distance = large_dist;
else
    distance = (trip_count/3 +1).
```

This prefetch distance calculation code combines the result of the unknown trip count example and the unknown data stride example above. In the remaining discussion the embodiments of the invention are discussed more generally and not with reference to the above examples.

Figure 8:
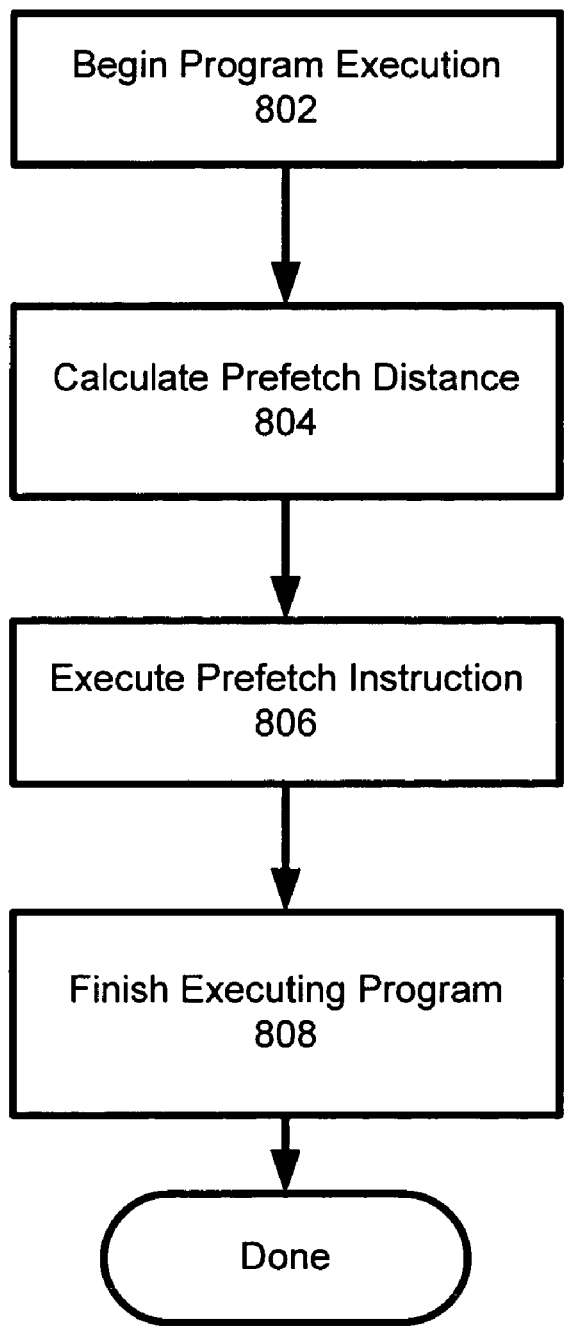
FIG. 8 is a flow diagram illustrating dynamic prefetch distance calculation according to one embodiment of the present invention.

FIG. 8 is a flow diagram illustrating actions performed by a processor executing a program compiled using a compiler implementing an embodiment of the invention. In block 802, the processor—in conjunction with the operating system—begins executing the program. In block 804, having arrived at a section of prefetch distance calculation code that was inserted by the compiler at compile-time, the processor dynamically calculates the prefetch distance using information that is now available at run-time that was not available at compile-time.

In block 806, a prefetch instruction is executed using the prefetch distance calculated in block 804. There may be more than one prefetch instruction that uses the prefetch distance calculated in block 804, as was seen in the examples above. In block 808, execution continues until the program terminates. During the remainder of the execution time, blocks 804 and 806 may be repeated as many times as necessary.

Example Computer System

Figure 9:
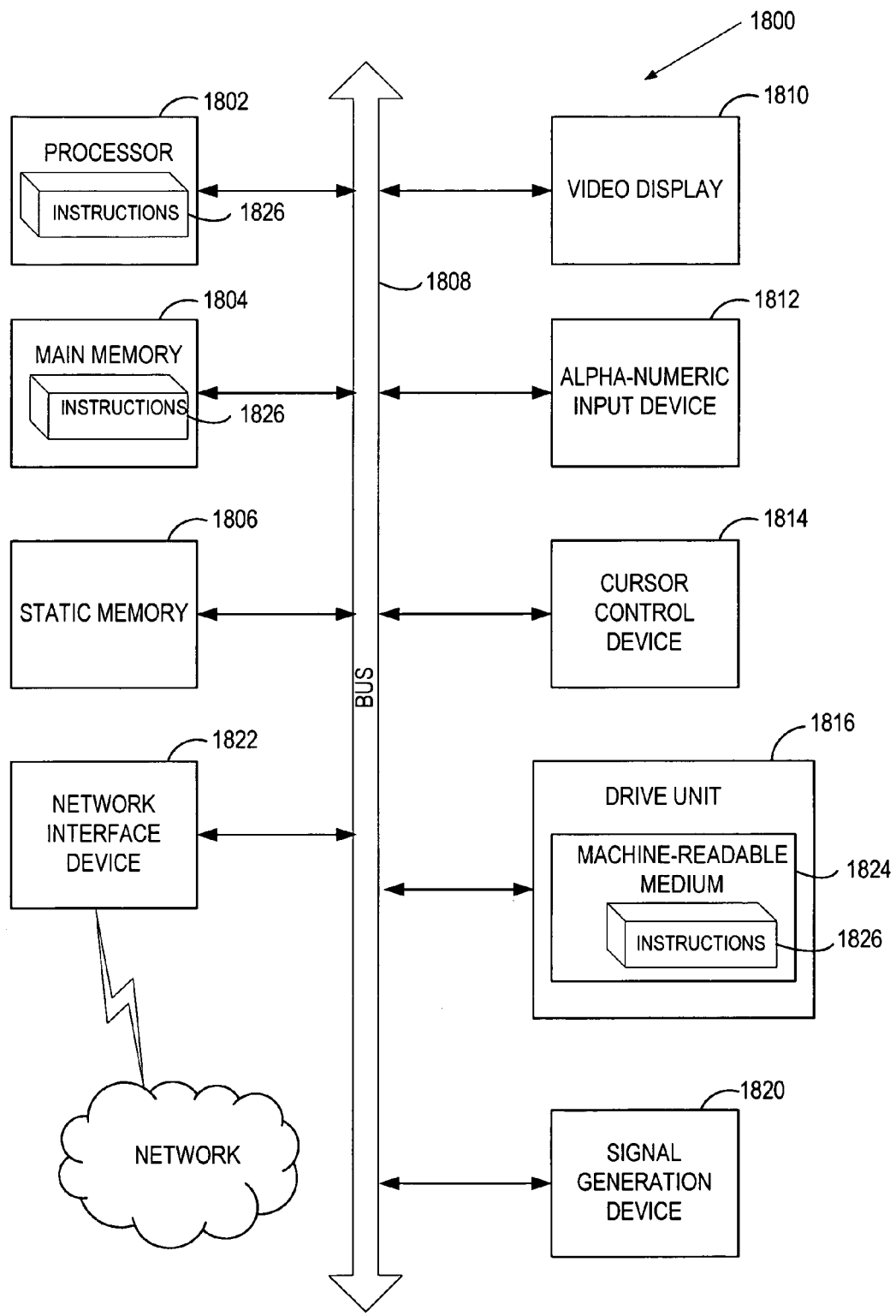
FIG. 9 is a block diagram illustrating an example computer system according to one embodiment of the present invention.

Various embodiments of the present invention have been described in the context of a compiler that generates code that is inserted into a program being compiled by the compiler. An example computer system on which such a compiler can be implemented in now described with reference to FIG. 9. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, a signal generation device 1820 (e.g., a speaker) and a network interface device 1822.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable storage medium" shall be taken to include any medium that is capable of storing or encoding a sequence of instructions for execution by the computer and that cause the computer to perform any one of the methodologies of the present invention. The term "machine-readable storage medium" shall accordingly be taken to included, but not be limited to, solid-state memories, optical and magnetic disks.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a computer program to be compiled;
   identifying a loop included in the computer program, the loop comprising a trip-count for calculating a prefetch distance for a prefetch instruction during the performance of prefetch optimization on the computer program, wherein the trip count is not statically known;
   generating prefetch distance calculation code in response to identifying the loop, wherein the prefetch distance calculation code calculates the prefetch distance when executed by
      having the prefetch distance cover all latency associated with a memory access if the trip-count of the loop at run-time is more than three times the distance needed to cover all latency associated with a memory access, and
      having the prefetch distance equal to one plus one-third of the trip-count of the loop at run-time if the trip-count of the loop at run-time is less than or equal to three times the distance needed to cover all latency associated with a memory access;
   generating the prefetch instruction during the performance of prefetch optimization on the computer program, the prefetch instruction using the prefetch distance calculated by the prefetch distance calculation code at run-time; and
   inserting the prefetch distance calculation code before the loop; and inserting the prefetch instruction inside the loop.

2. The method of claim 1, wherein the loop is included in a plurality of nested loops.

3. The method claim 2, wherein prefetch distance calculation code calculates the prefetch distance by having the prefetch distance cover all latency associated with a memory access if the trip-count of the loop at run-time of the loop substantially covers the extent of an array in the dimension being traversed by the loop.

4. The method of claim 3, wherein the trip-count of the loop at run-time of the inside loop substantially covers the extent of an array in the direction being traversed by the loop if the extent of the array in the dimension being traversed by the loop is not more than 8 greater than the trio-count of the loop at run-time.

5. An apparatus comprising:
   a static memory;
   a processor;
   a computer program including a loop accessing the static memory, the loop further comprising a trip-count for calculating a prefetch distance for a prefetch instruction during the performance of prefetch optimization on the computer program, wherein the trip count is not statically known; and
   a compiler executed via the processor, the compiler configured to
      generate prefetch distance calculation code in response to identifying the loop, wherein the prefetch distance calculation code calculates the prefetch distance when executed by
         having the prefetch distance cover all latency associated with a memory access if the trip-count of the loop at run-time is more than three times the distance needed to cover all latency associated with a memory access, and
         having the prefetch distance equal to one plus one-third of the trip-count of the loop at run-time if the trip-count of the loop at run-time is less than or equal to three times the distance needed to cover all latency associated with a memory access,
      generate the prefetch instruction during the performance of prefetch optimization on the computer program, the prefetch instruction using the prefetch distance calculated by the prefetch distance calculation code at run-time, and insert the prefetch distance calculation code before the loop, and insert the prefetch instruction inside the loop.

6. The apparatus of claim 5, wherein the loop is included in a plurality of nested loops.

7. The apparatus of claim 6, wherein prefetch distance calculation code calculates the prefetch distance by having the prefetch distance cover all latency associated with a memory access if the trip-count of the loop at run-time of the loop substantially covers the extent of an array in the dimension being traversed by the loop.

8. The apparatus of claim 7, wherein the trip-count of the loop at run-time of the inside loop substantially covers the extent of an array in the direction being traversed by the loop if the extent of the array in the dimension being traversed by the inside loop is not more than 8 greater than the trip-count of the loop at run-time.

9. A machine-readable storage medium having stored thereon data representing instructions that, when executed by a processor, cause the processor to perform operations comprising:

receiving a computer program to be compiled;

identifying a loop included in the computer program, the loop comprising a trip-count for calculating a prefetch distance for a prefetch instruction during the performance of prefetch optimization on the computer program, wherein the trip count is not statically known;

generating prefetch distance calculation code in response to identifying the loop, wherein the prefetch distance calculation code calculates the prefetch distance when executed by having the prefetch distance cover all latency associated with a memory access if the trip-count of the loop at run-time is more than three times the distance needed to cover all latency associated with a memory access, and having the prefetch distance equal to one plus one-third of the trip-count of the loop at run-time if the trip-count of the loop at run-time is less than or equal to three times the distance needed to cover all latency associated with a memory access;

generating the prefetch instruction during the performance of prefetch optimization on the computer program, the prefetch instruction using the prefetch distance calculated by the prefetch distance calculation code at run-time; and inserting the prefetch distance calculation code before the loop, and inserting the prefetch instruction inside the loop.

10. The machine-readable storage medium of claim 9, wherein the loop is included in a plurality of nested loops.

11. The machine-readable storage medium of claim 10, wherein prefetch distance calculation code calculates the prefetch distance by having the prefetch distance cover all latency associated with a memory access if the trip-count of the loop at run-time of the loop substantially covers the extent of an array in the dimension being traversed by the loop.

12. The machine-readable storage medium of claim 11, wherein the trip-count of the loop at run-time of the inside loop substantially covers the extent of an array in the direction being traversed by the loop if the extent of the array in the dimension being traversed by the loop is not more than 8 greater than the trip-count of the loop at run-time.

* * * * *